Dec. 24, 1968
J. Y. BARBIER
3,418,451
ELECTRIC HOT WATER UNIT HEATER UTILIZING
REPLACEABLE CARTRIDGE
Filed April 22, 1966
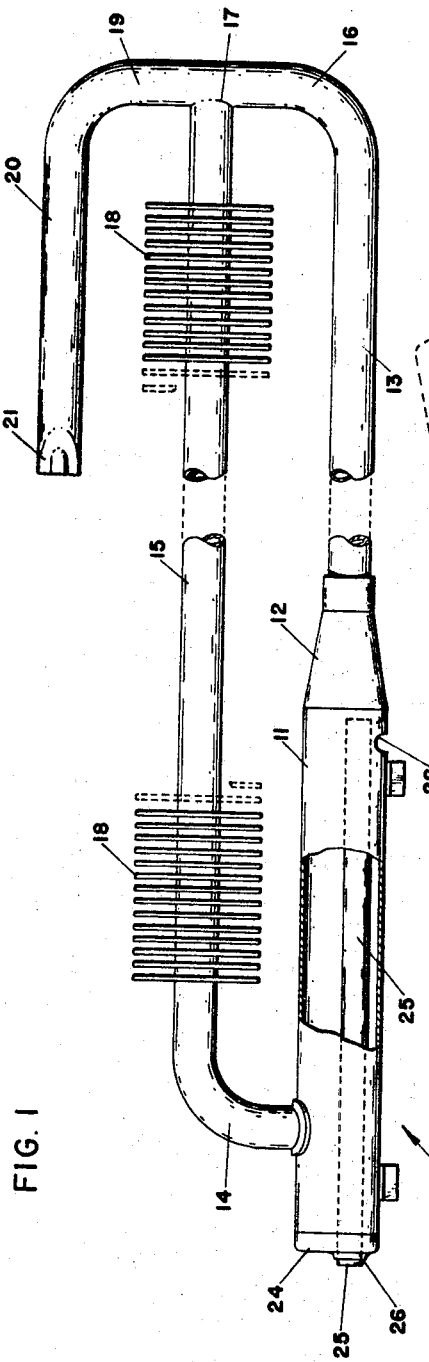
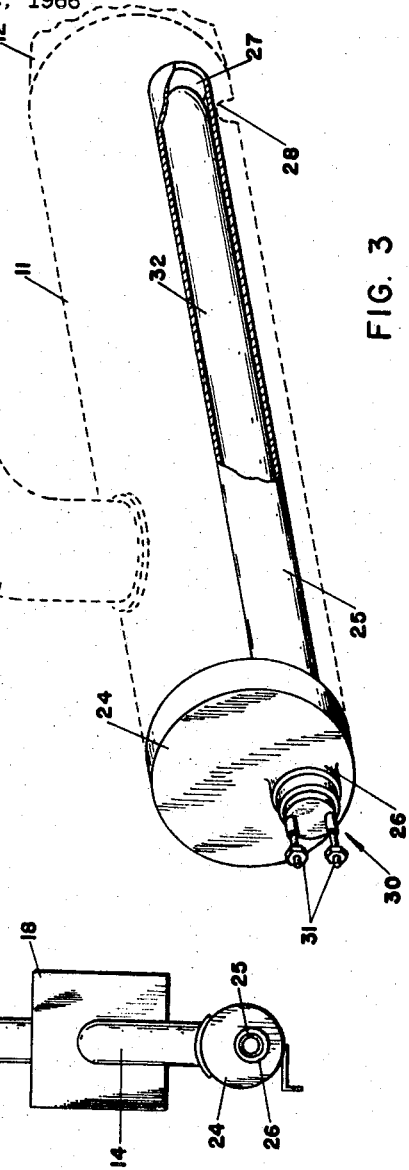
INVENTOR
JEAN Y. BARBIER
BY
*Jerome G. Gross*
ATTORNEY

# United States Patent Office 3,418,451
Patented Dec. 24, 1968

3,418,451
ELECTRIC HOT WATER UNIT HEATER UTILIZING REPLACEABLE CARTRIDGE
Jean Y. Barbier, St. Louis, Mo., assignor to International Oil Burner Company, St. Louis, Mo., a corporation of Missouri
Filed Apr. 22, 1966, Ser. No. 544,466
1 Claim. (Cl. 219—341)

ABSTRACT OF THE DISCLOSURE

A self-contained hot-water baseboard unit heater includes a tubular water heating chamber and a closed water-flow circulating passage extending in thermo-syphonic flow relation to the chamber. A portion of the circulating passage is provided with heat exchange fins. The water heating chamber is provided with a sealed tubular well in which is slidably removably fitted a replaceable electric resistance heating unit. The well is located below the horizontal center line of the heating chamber so as to enhance the circulation of water through the chamber and circulating passage.

---

This invention relates to the construction of heaters in which liquid, normally water, is heated by an electric resistance heater element. Specifically it is applicable to the construction of simple self-contained unit heaters commonly used for residential heating at floor level and referred to as baseboard heaters.

A principal problem of the prior art has arisen from the brazing in place of heater elements used in such heaters. Normally a water-flow path is provided through a heating chamber one of whose ends extends to the side of the heater, at which end an insulated copper-shielded resistance heater is crimped and brazed in place. This construction has practical shortcomings, some of which are: the heater unit cannot be inspected to determine whether it is strong and leak proof until the heater element is finally secured in place. The crimping and brazing operation by which it is secured in place may damage the heater element. Once crimped and brazed in place, it cannot be removed; thus the voltage at which the heater will operate cannot thereafter be changed. Slight defects in the sheathing in the heater unit, being in direct contact with the hot water may cause the unit to fail, either at once or after a short period of use as the result of expansion and contraction accompanying heating and cooling. To avoid electrolytic damage to brazed joints, copper-shielding on resistance heater units must be employed where the heating chamber and any retention member which holds the heater unit therein are copper; this requirement prevents the use of higher temperature heating elements which are sheathed with chrome nickel steel and the like.

The present invention overcomes these and other difficulties, as will be apparent from this specification. Generally it comprises an electrical hot water unit heater constructed without brazing the heater element in place; but instead providing a cylindrical tubular horizontally extending heater well made of copper. Such well is brazed at its outer edge within an end closure of the copper water-heating chamber, and supported at the other end so that it is positioned spacedly within the heating chamber through which the water of the unit heater circulates. An elongated cartridge-type cylindrical resistance heater, having both terminals projecting from its outer end, is fitted within this cylindrical well, with its outer surface in heat-conductive relationship with the cylindrical wall thereof. Such cartridge heater is readily removed through the open end of the well through which its terminal ends project. Its removable sliding fit, without brazing, permits the use of higher temperature cartridge heating elements, which utilize sheathing of chrome nickel steel.

Heater units made in accordance with the teachings of this invention may thus be preliminarily checked for soundness and water tightness prior to the installation of any heating element. Dealer stocks may be maintained at low levels, with cartridge heater units readily installed at the time of purchase to conform to voltages specified by the purchaser. The heater elements are not damaged on installation, as frequently occurred in past practice when the heaters were crimped and brazed in place; and small defects in their sheathing do not cause service difficulties because they are not exposed to water.

Having generally described the present invention, reference will now be made to the drawings, in which:

FIG. 1 is a side elevation of an electric hot water heater embodying the present invention, shown partly broken away.

FIG. 2 is a left end view thereof.

FIG. 3 is a perspective view partly fragmentary of the heating chamber end closure and the well member supported thereby, shown prior to assembly. The dotted lines represent a removable resistance cartridge heater.

Hot water baseboard unit heaters of the type herein described are well suited for residential heating. Such units, like those currently in use, are mounted within elongated convection-inducing metal frames, not shown, and may utilize conventional thermostatic controls, likewise not shown.

The present heater unit is shown in FIG. 1, it being understand that its length may vary substantially depending upon the capacity desired. The larger diameter member illustrated is a tubular water heating chamber generally designated 10. It comprises a principal horizontal water heating tube 11, preferably copper and of constant diameter, and a funnel-like adaptor portion 12 which is concentric with the water heating tube 11 and is brazed thereto, and effects a reduction in diameter to join a concentric lower flow passage tubular member 13 which extends horizontally therefrom. Into the upper wall of the water heating tube 11, an upward extending water flow passage tube 14, of a diameter similar to that of the lower tubular member 13, runs for a short distance to a level sufficiently above that of the water heating chamber 10 to provide space for convection fins hereinafter referred to. It then bends to run horizontally forming an upper finned flow passage portion 15, and extends the entire length of the lower tube member 13, joining a return bend portion 16 thereof at an expansion tube junction 17. The tube portions 14, 15, 16 and 13 thus provide a continuous closed water flow circuit passage which leads from a point adjacent to the left end of the heating chamber member 10, upward, horizontally down and then horizontally back to the adaptor portion 12. The upper horizontal flow passage portion 15 has transverse heat transfer fins 18 brazed thereon, to effect cooling of the water circulating therethrough by the flow of convection air upwardly between and over the surfaces of the fins 18. At the expansion tube junction 17 the water flow circuit passage is provided with means to permit expansion of the heated water; preferably this is a simple upward extension 19 of the return bend tube portion 16. It continues upward but slopes gradually to form a nearly horizontal expansion tube portion 20, sealed at its uppermost end 21.

Conventional prior heater units, including elements such as heretofore described, have had their heating chambers (which correspond to the chamber 10) completely closed at the left end, at which a brazed-in-place copper sheathed resistance heater has been permanently-installed. The resistance heaters so installed have usually been U-shaped, that is, of the type having two parallel portions extending from upper and lower terminal ends, connected at their remote ends by a bend. Such elongated U-immersion heaters are thus supported by their spaced-apart terminals; and this type of support renders them sufficiently rigid to hold them spacedly away from the walls of the heating chamber.

In contrast, the present invention utilizes a new thermal well construction, which is supported as shown in FIG. 3 and permits the use of linear cartridge-type heaters. The heating chamber end closure 24 is made of copper. A copper cylindrical tubular well 25 is secured by its brazed joint in an end closure neck portion 26, as shown in FIG. 3. At its remote (right) end, the well member 25 is sealed closed by a brazed end disc 27. This end rests on an upwardly extending indentation 28 formed in the lower surface of the water heating tube 11, as shown in dashed lines in FIG. 3. The indentation 28 supports the well member 25 spaced sufficiently above the lower surface of the water heating tube 11 to permit circulation of the water being heated, but below the central axis of the horizontal heating chamber 10. The cross-sectional area within the water heating tube 11, after subtracting the area taken up by the outer diameter of the tubular well member 25, is substantially greater than the cross-sectional area of the other elements 14, 15, 16, 13 of the tubular water flow circuit passage. This provides for slower flow of water through the heating chamber 10; and the position of the well member 25 below center serves to heat the entire volume of water within the heating chamber 10 to a substantially constant temperature. This is in contrast to the uneven heating which would follow from a higher positioning of the well member 25; in which case the water in the lower part of the heating chamber 10 would be heated less than that in the upper portion.

The metal end closure 24 and well member 25 are brazed together as a sub-assembly, as shown in FIG. 3; then assembled in place into the heating chamber 10 and brazed sealedly to close its left end. Thereafter the entire heating chamber and tubular flow passage structure illustrated is carefully tested under pressure. If satisfactory, the water flow passage is filled with a heat-transfer liquid through the open end 21 to a level in the upward extension 19 above the expansion tube junction 17. The liquid is usually water to which anti-freeze may be added; any such heat-transfer liquid is referred to in the claims hereafter as "water."

Heater units so made may be kept in stock pending receipt of orders specifying heaters of any desired voltage. When an order is received, an appropriate heater unit 30 is inserted within the well member 25. Elongated cylindrical resistance cartridge heaters such as heater 30 shown in dashed lines in FIG. 3, are utilized. Said heaters, commercially obtainable, have two electrical terminals 31 at the left end and, except at such end, are covered by a cylindrical metallic sheath 32. In the present invention, high-temperature cartridge heaters having non-copper metal sheaths 32 are utilized, preferably those sheathed with chrome nickel steel. The outer diameter of the cartridge heater 30 is sufficiently small to fit slidably within the horizontal well 25 in heat conductive relationship with its inner cylindrical wall. The small gap provided by the slidable fit within the well 25 may be left as an air gap or filled with a heat conductive grease-like material.

The use of the high-temperature non-copper sheath 32, especially chrome nickel steel, permits the heating of the cartridge heater 30 to a substantially higher temperature than would have been feasible with a copper-sheathed heater. This is true even though the heat must all be transferred to the water through the copper well 25. Slight pore-like imperfections in the sheath 32 are not exposed to water; small amounts of moisture cannot penetrate close to the hot electrical resistance and expand to fracture the sheath. The removable cartridge heater 30 is not crimped and brazed in place, which operations tended to damage the sheaths of prior-art heaters. Should the sheath 32 be slightly imperfect, either originally or as the result of continued heating and cooling, it may still function satisfactorily in its protected position within the well 25; and if it should fail in service, it is readily removed and replaced.

If a chrome nickel steel sheathed resistance heater were to be brazed into a copper heating chamber and then surrounded by the water to be heated, its brazed joint to the copper would undergo electrolytic deterioration. The present invention thus makes possible the use of high temperature chrome nickel sheathed resistance heater 30. It has been considered necessary to minimize contact between the immersion heater itself and the wall of a heating chamber. However there is no objection to supporting the remote (right) end of the horizontal wall 25. The dimpled indentation 28 provides this support without any intense local heating. Hence instead of the U-shaped heaters heretofore employed, which provided points of support at both terminals, the cylindrical cartridge heater 30 is in the present invention suitably supported in spaced position from the lower wall of the heating chamber, to permit adequate circulation of water being heated.

From this disclosure, variations in detailed construction will occur to those skilled in the art. Accordingly the present invention is not to be construed narrowly, but rather as co-extensive with the claims hereof.

I claim:
1. An electric heater of the baseboard type and comprising,
   a cylindrical tubular water heating chamber having a center line extending horizontally and being of constant internal cross-section over the greater part of its length,
   a tubular water-flow circuit passage of lesser internal cross-section and including a flow outlet connection at the upper side of the tubular heating chamber adjacent to one end thereof, the passage thence extending upwardly, thence horizontally through a radiator portion of said passage, thence downwardly, and thence returning horizontally in a return flow juncture at the other end of said water heating chamber,
   a metal end closure at the end of said heating chamber opposite to said juncture, the end closure having a circular opening whose center is below the center line of the cylindrical heating chamber,
   a cylindrical tubular well member formed of heat conductive metal and whose diameter equals that of the circular opening in said end closure, the well member having an open end sealed around its periphery to said circular opening and supported thereby,
   whereby the well member extends horizontally and spacedly within the heating chamber and with its cylinder axis below the center line of the heating chamber, and
   a cylindrical electrical resistance cartridge heater fitted slidably within the cylindrical well member through its open end and in heat conductive relationship with its cylindrical wall, whereby when the cartridge heater is energized, the position of the well member below the center line of the heating chamber expands water in said chamber substantially uniformly and thereby induces flow throughout the entire heating chamber and circulation through the circuit passage.

References Cited

UNITED STATES PATENTS

| | | |
|---|---|---|
| 1,124,548 | 1/1915 | Steller. |
| 1,511,553 | 10/1924 | Willson _____ 219—315 |
| 2,096,635 | 10/1937 | Goodwin _____ 219—357 X |
| 2,455,688 | 12/1948 | Malickson _____ 219—341 |
| 2,712,052 | 6/1955 | Buehne _____ 219—336 X |
| 2,772,342 | 11/1956 | Reynolds et al. _____ 219—341 |
| 2,860,226 | 11/1958 | Williams et al. _____ 219—336 X |
| 3,213,263 | 10/1965 | Steenbergen _____ 219—336 X |
| 3,281,574 | 10/1966 | Heiman _____ 219—341 |

FOREIGN PATENTS 823,237   10/1937   France.

ANTHONY BARTIS, *Primary Examiner.*

U.S. Cl. X.R.

219—315, 336; 237—16; 165—106